June 1, 1926.

A. BEHN ET AL 1,587,275

INTERNAL COMBUSTION ENGINE

Filed Nov. 4, 1922

INVENTORS
ADOLPH BEHN.
JOHN G. SCHMITT.
by *W. E. Kalb*
ATTORNEY.

June 1, 1926.  1,587,275
A. BEHN ET AL
INTERNAL COMBUSTION ENGINE
Filed Nov. 4, 1922    7 Sheets-Sheet 2
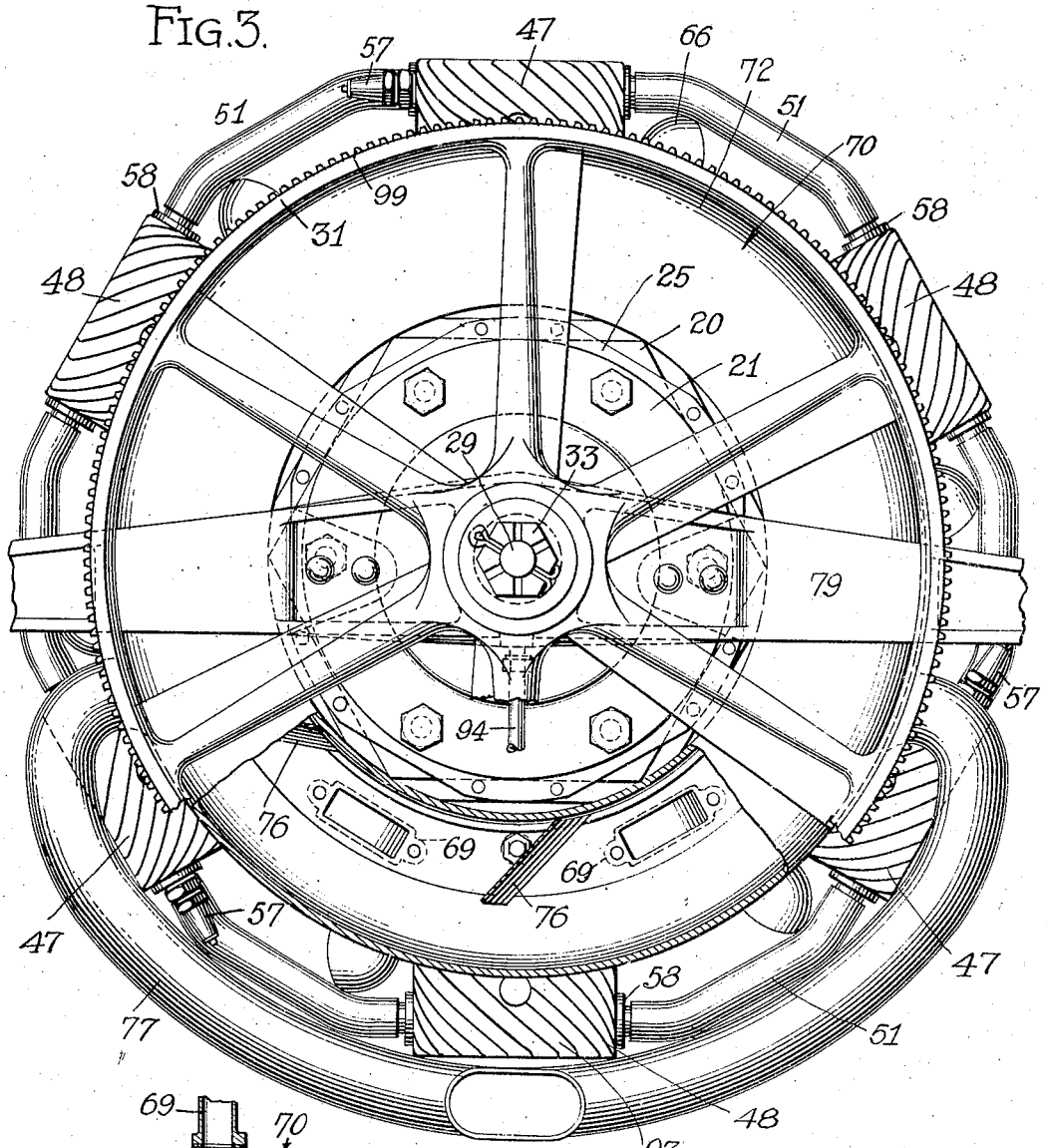
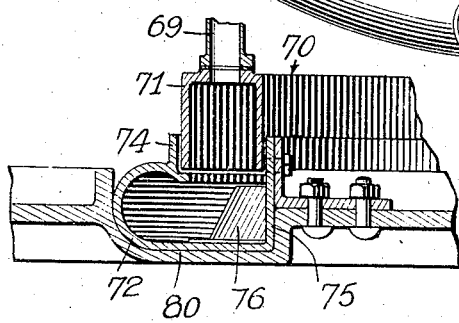
INVENTORS.
ADOLPH BEHN.
JOHN G. SCHMITT.
by
ATTORNEY.

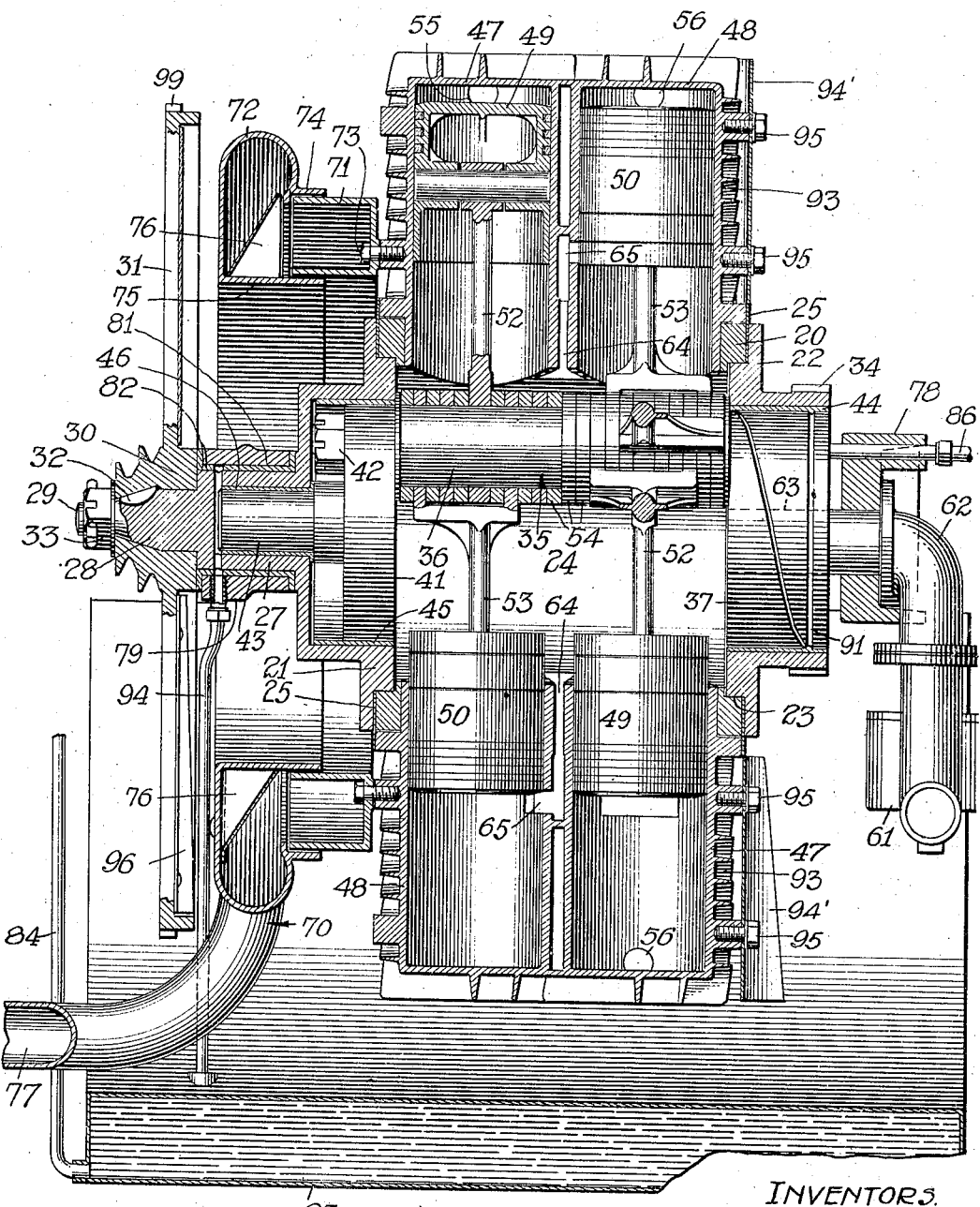

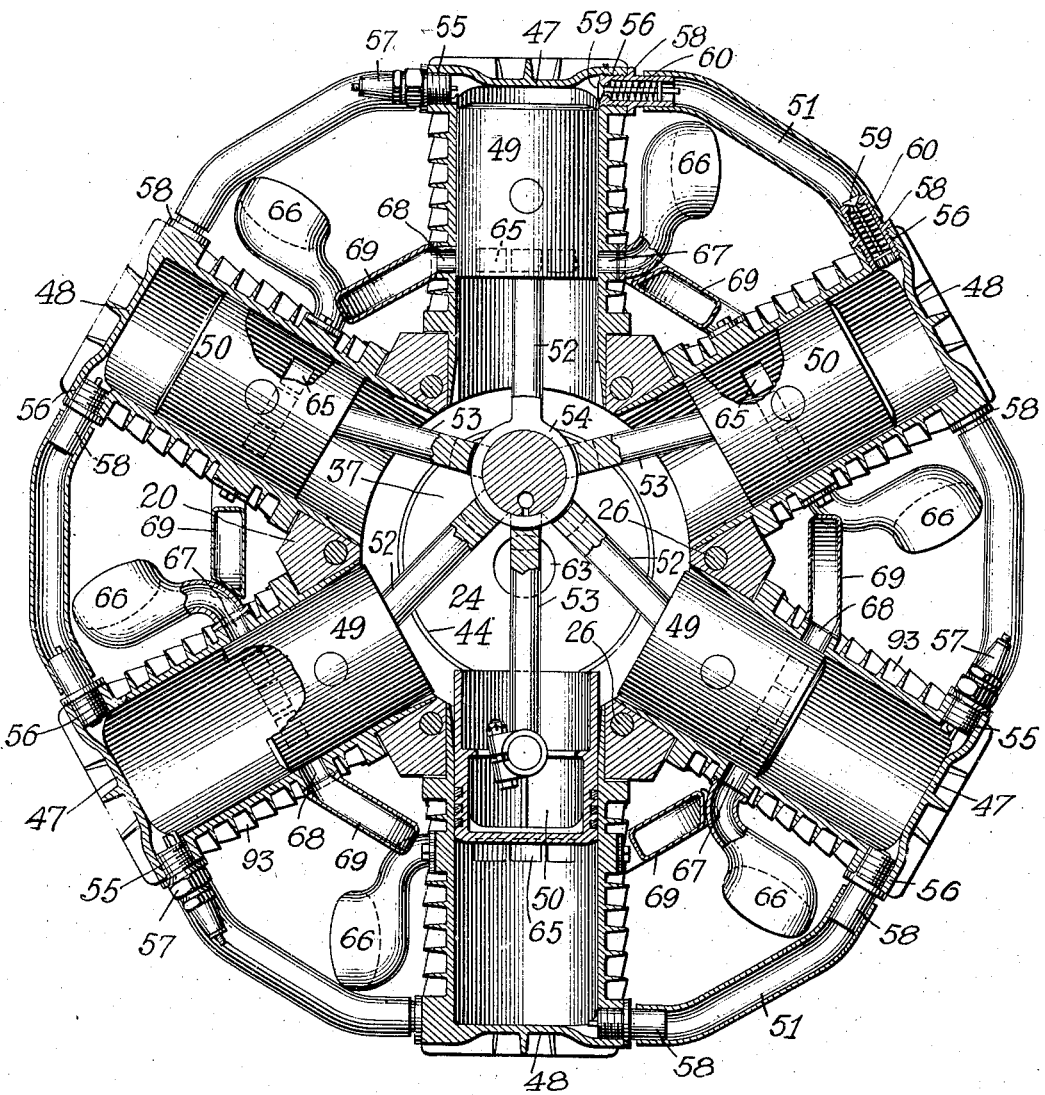

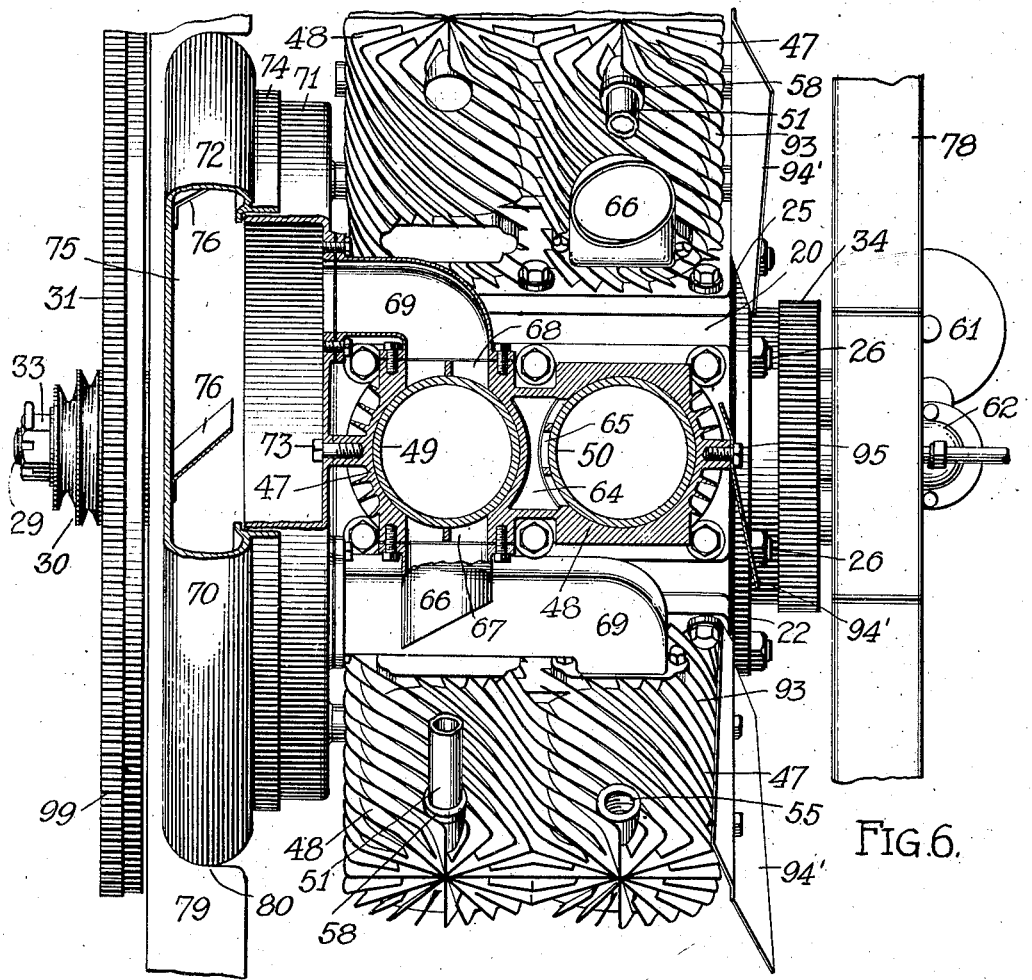
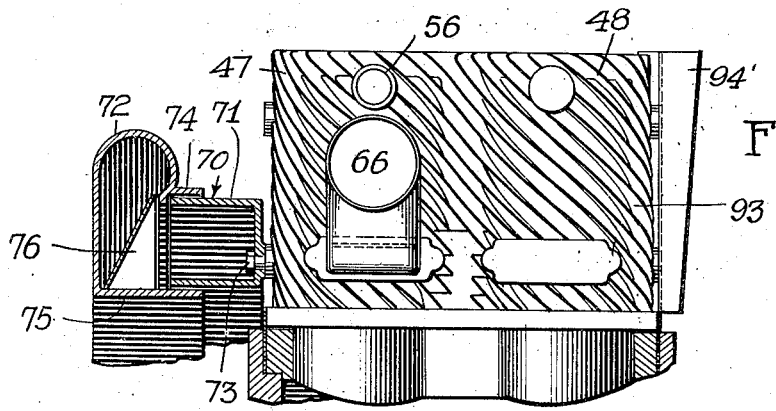

June 1, 1926.  
A. BEHN ET AL  
INTERNAL COMBUSTION ENGINE  
Filed Nov. 4, 1922    7 Sheets-Sheet 7

1,587,275

INVENTORS.  
ADOLPH BEHN.  
JOHN G. SCHMITT.  
BY  
ATTORNEY.

Patented June 1, 1926.

1,587,275

UNITED STATES PATENT OFFICE.

ADOLPH BEHN AND JOHN G. SCHMITT, OF NEW YORK, N. Y.

INTERNAL-COMBUSTION ENGINE.

Application filed November 4, 1922. Serial No. 599,034.

Our invention relates to rotary internal combustion engines, and more particularly to air cooled multi-cylinder engines of the two stroke cycle rectilinear type.

An object of the invention is to so construct and so arrange the cylinders of the engine in pairs or groups of two or more cylinders each that the piston of one cylinder of each pair or group will act to compress and deliver the fuel charge to the correspondingly disposed cylinder of the next adjacent cylinder group whereby, for each complete revolution of the engine, a working or power stroke is produced.

A further object of the invention is the arrangement of the fuel feed line connections between associated compression and working cylinders in such manner that said fuel feed line connections will, in each instance, deliver the fuel charges to the respective outer cylinder ends, and incidently, in view of such arrangement, interbrace the several cylinder groups.

A further object of the invention is the adoption of an arrangement by means of which the admission of the fuel charges and the exhaust of the spent gases respectively to and from the several working cylinders is directly controlled by the movements of the several pistons in covering and uncovering, at predetermined intervals, the necessary cylinder ports.

A further object of the invention is the provision of means, directly associated with each working cylinder, for completely and quickly affecting a removal of the products of combustion therefrom, such means comprising an air induction pipe open to the combustion chamber and an exhaust port preferably substantially diametrically opposed, said exhaust port being so disposed in its relation to the scavenging intake port as to open slightly in advance thereof.

A still further object of the invention is the provision of a novel form of annular exhaust manifold into which the exhaust pipes leading from separate working cylinders individually discharge, said manifold comprising a fixed part and a part rotatable with the engine cylinders, such parts being in open communication.

Other objects of the invention, such for instance as the improved means for cooling the heat generating parts of the motor, the means for inducing complete exhaust by creating a suction force in the intake manifold, the means employed for effecting a proper and thorough lubrication of the working parts of the engine, and the means employed for supplying fuel to the engine cylinders by way of the rotating crank case etc., will be hereinafter more fully described.

In the drawings, wherein like reference characters denote like or corresponding parts:—

Figure 3 is a rear end elevation of the engine with a portion of the fly-wheel and a portion of the exhaust manifold broken away;

Figure 4 is a longitudinal vertical sectional view of the engine;

Figure 5 is a transverse vertical sectional view of the engine;

Figure 6 is a part plan and part sectional view of the engine;

Figure 7 is a detail side elevation of one of the cylinder blocks;

Figure 8 is a detail sectional view of the annular exhaust manifold;

Figure 1:
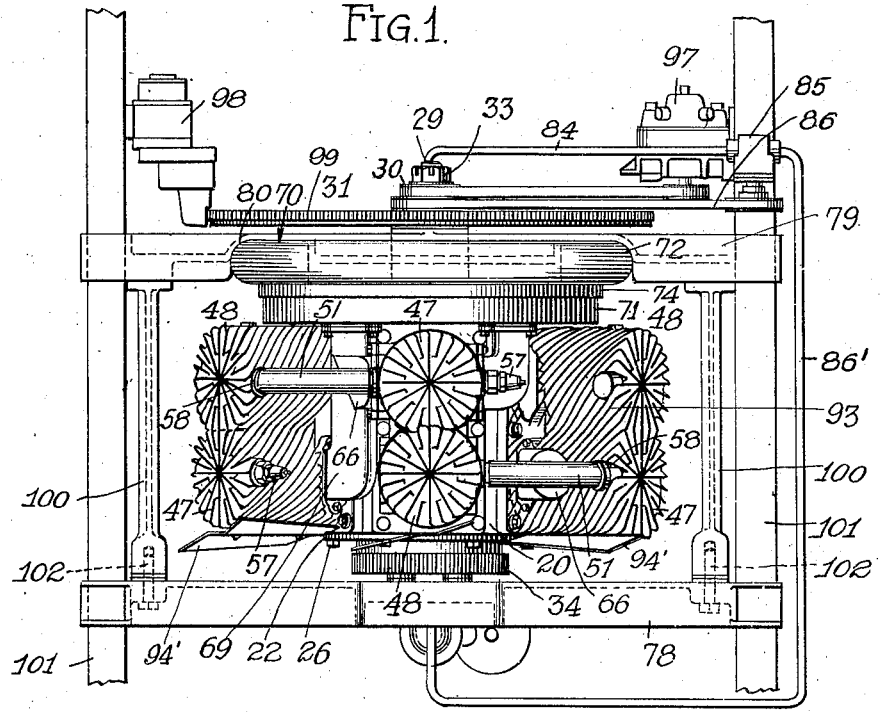
Figure 1 is a plan view of the engine showing a preferred form of engine support.

In the embodiment of the invention selected for illustration a twelve cylinder two stroke cycle rotary internal combustion engine is shown. The crank case of the engine, designated as 20, is preferably open ended and of hexagonal form in transverse section. It is provided with end closures 21 and 22, both of which closures are shouldered as at 23 to snugly engage with the inner wall of the crank case chamber 24. Between the end closures 21 and 22 and the opposite ends of the crank case, end plates 25 are disposed, said plates being held in place by bolts 26 which extend through the crank case at the points indicated in Figure 5.

The rear end closure 21, unlike the forward end closure 22, is provided with an integral hollow extension 27 and a driving extension 28. Said driving extension 28 is tapered throughout a portion of its length and is provided with a threaded end portion 29. On the tapered portion of said extension the hub 30 of a fly-wheel 31 is fitted, and since the driving extension is at all times rotatable with the crank case, obviously a driving connection for the fly-wheel is obtained. Preferably the fly-wheel hub 30 is keyed as indicated at 32 to the driving extension 28 and held against axial movement thereon by a lock-nut 33 screwed on the threaded end portion 29 of said extension.

The forward end closure 22, instead of being extended inwardly toward the axis of the crank shaft, terminates flush with the outer face of the forward big end bearing of said shaft. On its extended periphery gear teeth 34 are formed, said gear teeth affording a driving connection for an engine accessory, such for instance as a magneto (not shown).

The crank shaft of the engine, designated in its entirety as 35, is preferably of a two part construction. The crank or off-set portion 36 of the crank shaft and the forward big end bearing 37 thereof are preferably made integral, and together constitute one of the two crank shaft parts. Said off-set portion 36 at the end thereof opposite to the big end bearing 37 is provided with a tapered extension 38 having formed thereon a further extension 39. Said tapered extension 38, in the assembly of the crank shaft parts, is adapted to engage in a correspondingly tapered opening 40 formed in the rear big end bearing 41. A lock-nut 42 threaded on the extension 39 of the off-set serves as a fastening means for holding the crank shaft parts together.

Unlike the forward big end bearing 37, the rear big end bearing 41 is provided with a concentric extension 43 which is adapted to engage in the hollow extension 27 of the crank case. Both big end bearings, 37 and 41, together with the extension 43 formed on the latter, constitute the necessary bearing surfaces about which the crank case 22 revolves. Bushings 44, 45, and 46 are preferably interposed between the big end bearings 37—41 and the end closures 22—21 on the one hand and the crank shaft extension 43 and the hollow crank case extension 27 on the other. Thus organized, the crank case is free to revolve about the crank shaft with a minimum of ease and wear.

The cylinder groups, of which there are six, are preferably cast en bloc, each group including two or more cylinders of equal bore and of generally similar construction. Half only of the total number of cylinders constitute working cylinders, the remaining half functioning merely as cylinders within which the fuel charge necessary to the operation of the motor is adapted to be compressed and delivered to the working cylinders comprised in adjacent cylinder groups. The working cylinders of each cylinder group are designated as 47, whereas the compression cylinders of each group are designated as 48. Within each working cylinder a power piston 49 is enclosed and within each compression cylinder 48 a compression piston 50 is enclosed. The working pistons 49 are in each instance connected with the off-set 36 of the crank shaft, as are also the pistons 50 mounted in the compression cylinders 48. In the arrangement disclosed, the cylinders comprised in the several cylinder groups are mounted in two series, each series comprising three compression cylinders and three working cylinders alternately disposed radially about the crank case 22. Instead of connecting the compression cylinders 48 comprised in the several cylinder groups with the working cylinders 47 comprised in the corresponding groups, the compression cylinders 48 are connected with the working cylinders of adjacent cylinder groups, suitable fuel feed line connections 51 of substantially arcuate form being provided for this purpose. Thus organized, it is apparent that the two series of cylinders function independently in that the three compression cylinders comprised in a single series function only to compress and deliver fuel charges to the working cylinders of the same series, and not to the working cylinders comprised in series number two.

Figure 9:
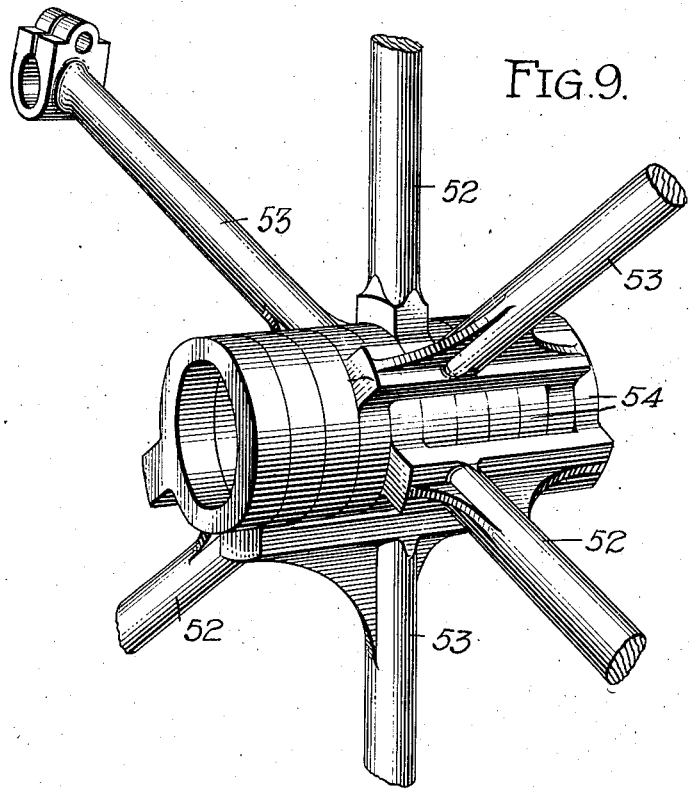
Figure 9 is a perspective view of the inner connecting rod ends.
Figure 10:
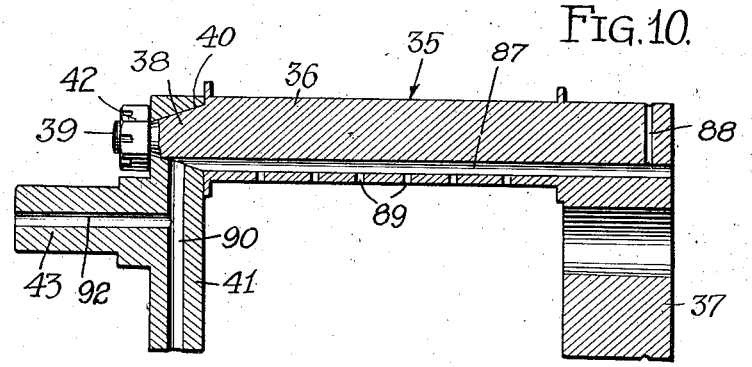
Figure 10 is a detail sectional view of the crank shaft.
Figure 11:
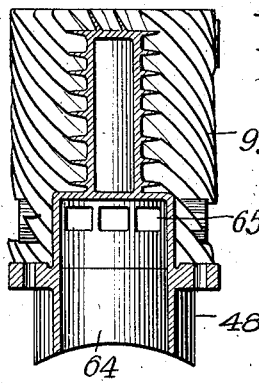
Figure 11 is a longitudinal vertical sectional view of one of the cylinder blocks.
Figure 12:
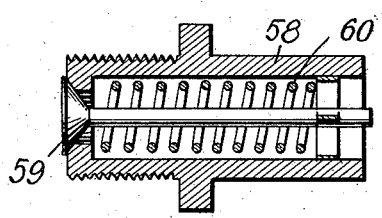
Figure 12 is a longitudinal sectional view of one of the valve casings.

In Figure 9 of the drawings the preferred arrangement of the inner connecting-rod ends is shown. It will be noted in said figure that the six connecting-rods comprised in a single series extend radially outwardly from the off-set 36 in the crank shaft. Such connecting-rods are designated as 52 and 53, 52 denoting the connecting-rods for the working pistons 49, and 53 denoting the connecting-rods for the compression pistons 50, said pistons 49 and 50 being the total number of pistons provided for the six cylinders comprised in a single cylinder series. At their inner ends the connecting-rods 52 and 53 are so mounted on the off-set in the crank shaft as to rotate freely thereabout, connecting-rod rings 54 which encircle the crank shaft off-set being provided for this purpose. The grouping of the connecting-rod rings 54 about the crank shaft is preferably such that at least one connecting-rod ring for each connecting-rod 52 will lie as close as possible to the transverse center line of the connecting-rod series. This arrangement is preferred for the reason that the connecting-rods 52 connect with the working pistons and are therefore subject to greater stresses during the operation of the engine than are the connecting rods which connect with the pistons contained in the compression cylinders.

As hereinabove intimated, each of the several cylinders comprised in the total number of cylinder groups is of a generally similar construction. Both the compression cylinders and the working cylinders are provided at their outer ends with diametrically opposed internally threaded openings 55 and 56, the openings 55 in the compression cylinders being plugged, as they serve no useful purpose. Within the openings 55 of the working cylinders any form of conventional spark-plug 57 is threaded. The threaded openings 56 of the cylinders are each adapted to receive an exteriorly threaded valve casing 58, the valve casing for the compression cylinders, although generally similar, being of a somewhat different construction. Over the projected ends of the valve casing 58 of correspondingly disposed working cylinders and compression cylinders comprised in adjacent cylinder groups, the opposite ends of the fuel feed line connections 51 are fitted, and since each of the several valve casings 58 are open to the cylinders into which said casings are threaded, obviously the necessary fuel feed line connection between correspondingly disposed cylinders of adjacent cylinder groups is established.

Within each valve casing 58 a check valve 59 is mounted, the valves in each instance being spring pressed as indicated at 60. The valves for the compression cylinders open outwardly or away from the cylinder bodies, and the valves for the working cylinders open inwardly or toward the cylinder bodies; such arrangement being essential as a check against the return flow of the fuel charges once they leave the compression cylinders and once they enter the working cylinders (see Figure 5).

In the cylinder arrangement adopted, six power strokes are obtained, one for each working cylinder, for each complete revolution of the motor, the timing of the motor being preferably such that each working cylinder is made to execute its power stroke the moment such cylinder approaches the "on top" or vertical position.

The fuel necessary to the operation of the motor is supplied by a carburetor 61. Said carburetor is connected as at 62 with an opening 63 formed in the forward big end bearing 37 of the crank shaft and leading inwardly through said bearing to the crank chamber 24 formed in the crank case. From the crank chamber 24 the fuel is conducted to the compression cylinders 48 through fuel passageways 64 formed in the cylinder groups between the cylinders comprising them. These passageways 64 are radially arranged and communicate, one with each compression cylinder, at their outer ends, through intake ports 65 formed in the compression cylinder walls at points immediately beyond the outer ends of the compression pistons 50 when said pistons shall have attained their innermost position. The fuel thus entering through the intake ports 65 is immediately partially compressed and delivered to the adjacent working cylinders with which such compression cylinders are associated. Upon entering the working cylinders the fuel charges thus admitted are further compressed and finally ignited, thereby driving the working pistons 49 away from the outer cylinder ends.

To completely scavenge the working cylinders 47 of the products of combustion, an auxiliary air supply is admitted to the combustion chamber of each cylinder at a point substantially diametrically opposite an exhaust port formed therein. Said auxiliary air supply means comprises an induction pipe 66 for each working cylinder, the induction pipe for each cylinder being provided with a flared outer end open to the outside atmosphere in the direction of rotation of the engine. Said induction pipes 66 at their inner ends are fastened to the cylinder bodies directly over the scavenging intake ports 67 through which the auxiliary air supply is admitted. Obviously, therefore the moment the scavenging intake ports 67 are uncovered by the movements of the working pistons the air entrapped in the induction pipes 66 will rush in the working cylinders above the pistons and carry along with it, as it leaves the cylinders, the products of combustion.

The exhaust ports 68 formed in the working cylinders substantially diametrically opposite the scavenging intake ports 67 have each connected with them an exhaust pipe 69. These exhaust pipes 69 extend rearwardly between the cylinder groups to points of discharge within an annular exhaust manifold, designated in its entirety as 70. Said exhaust manifold 70 comprises a rotating part 71 and a fixed part 72, the former being bolted as at 73 to the rear series of cylinders. Said manifold parts 71 and 72 are in open communication, the part 71 being preferably of channel section with its open side extended between spaced annular flanges 74 and 75 formed on the fixed part 72. As a means for inducing complete exhaust and for creating a suction force within the annular manifold 70, fan blades 76 are provided on the inside of the fixed part 72 of the manifold. From the annular exhaust manifold the products of combustion ultimately find their way through an outlet 77 to a muffler (not shown).

The support for the engine and for the engine accessories employed in connection therewith preferably comprises transverse engine bearers 78 and 79, the former being disposed at the forward end of the motor and the latter at the opposite end thereof. Said engine bearer 79 is of channel section and intermediately of its ends is shaped as at 80 to receive and support the fixed part 72 of the exhaust manifold 70. It is further provided, likewise intermediately of its ends, with an opening 81 into which the hollow extension 27 of the crank case is fitted. Through the use of a bushing 82 between said hollow extension and the walls of said opening an effective support for the rear end of the motor is provided.

At its forward end the motor is supported by the transverse engine bearer 78, said bearer being bolted as at 82' to the forward big end bearing 37 of the crank shaft, and the crank shaft in this manner held stationary.

Figure 2:
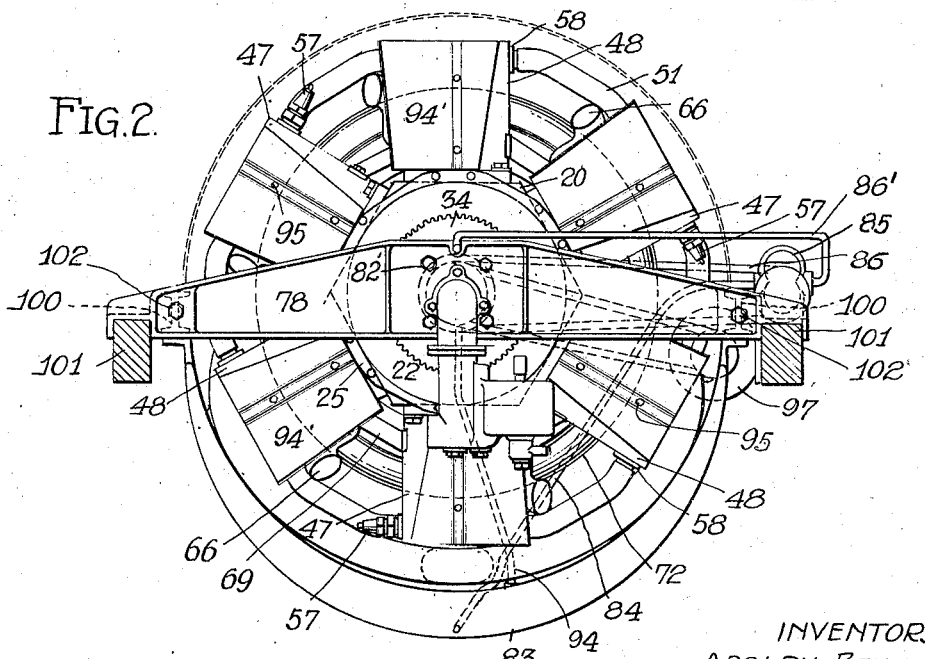
Figure 2 is a front end elevation of the engine further illustrating its support.

The means employed for oiling the moving parts of the motor includes an oil reservoir 83 preferably disposed below the engine and held in place by suspension as indicated in Figure 2. An oil supply pipe 84 leads from the reservoir 83 to an oil pump 85 belt driven as at 86 from the hub 30 of the fly-wheel, said hub, for this purpose, being constructed in the form of a double pulley as indicated in Figure 4. From the oil pump 85 the oil is delivered under pressure through a feed line 86' to a distributing oil duct 87 formed in the off-set 36 of the crank shaft 35. Branch oil ducts 88, 89, and 90 are formed respectively in the big end bearing 37, the off-set 36, and the big end bearing 41 of the crank shaft, the oil duct 88 being arranged to deliver oil to the forward bearing surface, the oil ducts 89 arranged to deliver oil to the inner connecting-rod ends, and the oil duct 90 arranged to deliver oil to the rear big end bearing surface. To distribute the oil uniformly over the forward big end bearing surface oil grooves 91 are formed on the periphery of said bearing as indicated in Figure 4. From the oil duct 90 a branch duct 92 leads rearwardly through the crank shaft extension 43, said duct terminating at the outer end of said extension to deliver oil to the outer bearing of the hollow crank case extension 27. From said outer bearing the surplus oil is returned to the reservoir 83 through a return pipe 94. Thus organized, a full pressure feed oiling system is provided reaching all parts of the motor required to be lubricated.

The cooling of the motor is obtained primarily through the use of cooling fins 93 formed on the exterior of the cylinder bodies, and preferably spiralled thereabout. As an auxiliary cooling means two fans are provided, one in advance of and the other to the rear of the engine cylinders. The blades 94' of the forward fan are bolted as at 95 to the forward series of engine cylinders, whereas the blades 96 of the rear fan are fastened in any suitable manner to the spokes of the fly-wheel. In this manner the air necessary to the efficient cooling of the motor cylinders is directed rearwardly over the cooling fins 93 by the forward fan and withdrawn therefrom by the rear fan to be thereby constantly kept in rapid motion.

In addition to the oil pump drive 86, the double pulley formed at the hub of the fly-wheel 31 serves also as a driving means for the generator 97, said generator being preferably mounted at one side of the motor as indicated in Figure 1. There is also provided as a driving means for the conventional electric starter 98, gear teeth 99, said teeth being formed on the outer periphery of the fly-wheel to mesh with the starter gear, undesignated.

It will be seen from the above, taken in connection with the accompanying drawings, that a motor thus characterized is exceedingly compact and exceptionally economical in operation. By arranging the scavenging intake ports 67 and the exhaust ports 68 of the working cylinders 47 slightly out of alignment, the pressures in the combustion chambers will be partly relieved prior to the admission of the auxiliary air supply. It will be further observed that the relative arrangement of the scavenging intake ports and exhaust ports is such that a portion at least of the incoming auxiliary air supply will be entrapped in the working cylinders to offer a cooling effect thereon and at the same time better the fuel mixture necessary to the operation of the motor. Moreover, by placing the fuel feed line connections 51 at the outer cylinder ends, said connections not only serve as the necessary fuel delivery means, but they further function as strengthening members interconnecting adjacent cylinder groups.

Figure 13:
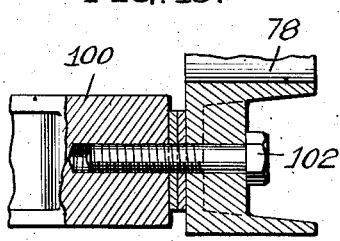
Figure 13 is a fragmentary sectional view showing the manner in which the engine bearers are fastened to the frame or chassis of the vehicle in connection with which the motor is adapted to be used.
Figure 14:
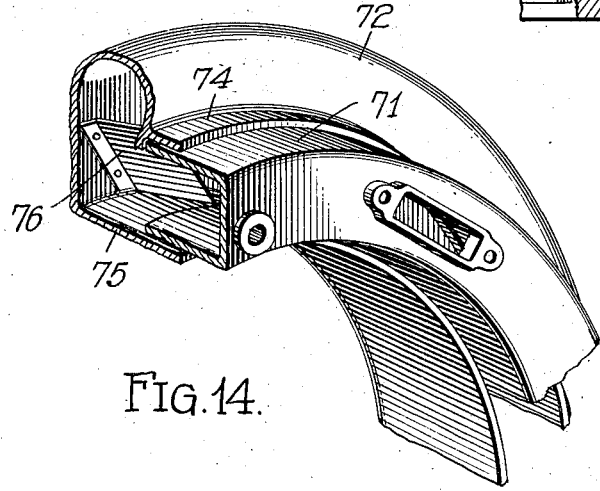
Figure 14 is a fragmentary perspective view of the annular exhaust manifold, showing the manner in which the parts thereof interengage.

In Fig. 13 of the drawings we have illustrated a preferred form of connection between one of the side rails 100 of the frame or chassis of the vehicle 101 and the forward engine bearer 78. As intimated, the channel members 78 and 79 are of channel section and so disposed relatively to the side rails 100 as to provide a butt-joint at the opposite ends of the said rails, securing bolts 102 being used as a fastening means at such points.

Figure 15:
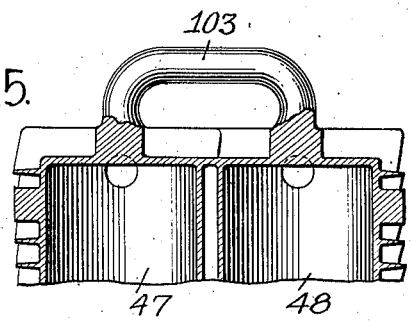
Figure 15 is a fragmentary sectional view illustrating a form of hand-grip which may be conveniently used in starting.

We have further illustrated in Figure 15 a hand-grip 103 as a means for hand starting. Each cylinder block is provided with an integrally formed grip so disposed on its outer end as to admit of manual rotation of the motor when it is desired to start the same by hand.

While we have described our invention in detail in its present preferred embodiment, it will be obvious to those skilled in the art after understanding our invention, that various changes and modifications may be made therein without departing from the spirit or scope thereof. We aim in the appended claims to cover all such modifications and changes.

What we claim is:—

1. The combination, in a rotary internal combustion engine, of a crank shaft, a plurality of cylinders arranged radially about about the crank shaft in groups of two cylinders each, the cylinders of each group being cast en bloc and aligned longitudinally of the crank shaft axis, each cylinder group including a compression cylinder and a working cylinder; and a plurality of fuel feed line connections respectively between each compression cylinder and one working cylinder only of the next adjacent cylinder group, said connections, in each instance, being confined to the cylinders comprised in a single radial series, and being extended, in each instance, away from the compression cylinder in a direction counter to the direction of rotation of the motor.

2. The combination, in a rotary internal combustion engine, of a crank shaft, a plurality of cylinders arranged radially about the crank shaft in tandem series, the correspondingly disposed cylinders of the separate tandem series being cast en bloc, and the cylinders of each said series being alternately working cylinders and compression cylinders, and the tandem cylinders of one said series being oppositely working or compression (as the case may be) with respect to the correspondingly disposed cylinders of the other said series, and fuel feed line connections respectively between each compression cylinder and one working cylinder only of the next adjacent cylinder group, said connections, in each instance, being confined to the cylinders comprised in a single radial series, and being extended, in each instance, away from the compression cylinder in a direction counter to the direction of rotation of the motor.

3. The combination, in a rotary internal combustion engine, of a stationary crank shaft, a crank case, a plurality of cylinders arranged radially about the crank shaft in groups of two cylinders each, the cylinders of each group being cast en bloc and aligned longitudinally of the crank shaft axis, each cylinder group including a compression cylinder and a working cylinder having formed therebetween and within the cylinder casting a fuel passageway leading radially outwardly from said crank case to a point of discharge laterally into the compression cylinders only, and fuel feed line connections respectively between each compression cylinder and one working cylinder only of the next adjacent cylinder group, said connections, in each instance, being confined to the cylinders comprised in a single radial series, and being extended, in each instance, away from the compression cylinder in a direction counter to the direction of rotation of the motor.

4. The combination, in a rotary internal combustion engine, of a crank shaft, a crank case, a plurality of cylinders arranged radially about the crank shaft in tandem series, the correspondingly disposed cylinders of the separate tandem series being cast en bloc, and the cylinders of each said series being alternately working cylinders and compression cylinders, and the tandem cylinders of one said series being oppositely working or compression (as the case may be) with respect to the correspondingly disposed cylinders of the other said series, a fuel passageway formed in each cylinder block between the cylinders thereof, each said fuel passageway leading radially outwardly from said crank case to a point of discharge laterally into the compression cylinders only, and fuel feed line connections respectively between each compression cylinder and one working cylinder only of the next adjacent cylinder block, said connections, in each instance, being confined to the cylinders comprised in a single radial series, and being extended, in each instance, away from the compression cylinder in a direction counter to the direction of rotation of the motor.

5. The combination, in a rotary internal combustion engine, of a stationary crank shaft, a plurality of cylinders arranged radially about the crank shaft, said radial cylinders being alternately working cylinders and compression cylinders, a piston for each cylinder, a connecting rod for each piston, a connecting rod ring formed on the inner end of each connecting rod, said rings being so relatively arranged that the rings formed on the connecting rods which enter the working cylinders lie closer to the transverse center line of the connecting rod series than do the rings formed on the connecting rods which enter the compression cylinders.

6. The combination, in a rotary internal combustion engine, of a stationary crank shaft, a plurality of rotating cylinders arranged radially about the crank shaft, said cylinders being alternately working cylinders and compression cylinders, a piston for each cylinder, a connecting rod for each piston, and one or more connecting rod rings formed on the inner end of each connecting rod to encircle the crank shaft, said rings being so relatively arranged that one ring of each connecting rod entering a working cylinder lies closer to the transverse center line of the connecting rod series than do the rings of the connecting rods entering the compression cylinders.

7. The combination, in a rotary internal combustion engine, of a crank shaft having but a single offset, a crank case provided with annular bearing surfaces at its opposite ends of a radius equal to or greater than the radius of the crank shaft offset as measured from the axis of said shaft to the outermost point of said offset, an enlargement formed on the and each end of the crank shaft, said enlargements being adapted to respectively engage within the crank case openings as defined by said bearing surfaces, and one of said enlargements having formed therein a straight line center bore which, at its inner end, discharges directly into the crank case at a point wholly unobstructed by the offset in the crank shaft, cylinders arranged in groups of two each disposed radially about the crank case, each cylinder group being cast en bloc and having formed therein between the cylinders thereof an outwardly extending fuel passageway, each said passageway at its outer end discharging laterally into one only of the cylinders comprised in a single cylinder group, and a carburetor for supplying fuel to said crank case thru the straight line center bore of the crank shaft enlargement.

8. The combination, in a rotary internal combustion engine, of a crank case, a crank shaft, a plurality of cylinders arranged radially about the crank shaft in tandem series, the correspondingly disposed cylinders of the separate tandem series being cast en bloc, and the cylinders of each of said series being alternately working cylinders and compression cylinders, and the tandem cylinders of one of said series being oppositely working or compression (as the case may be) with respect to the correspondingly disposed cylinders of the other of said series, said correspondingly disposed cylinders having formed between them and within the block casting a plurality of radial passageways, each of which passageways at its inner end is open to the crank case and each of which at its outer end is opened laterally to the compression cylinders only at a point intermediate the cylinder ends, fuel feed line connections respectively between each compression cylinder and one working cylinder only of the next adjacent cylinder block, said connections in each instance, being confined to the cylinders comprised in a single radial series, and being and extended, in each instance, away from the compression cylinder in a direction counter to the direction of rotation of the motor, an exhaust pipe for each working cylinder, the exhaust pipes, in each instance, being rotatable with said cylinders, an annular exhaust manifold into which said pipes discharge, said manifold comprising a rotatable part of channel section and a fixed part of channel section, said two parts being adapted to fit one within the other with their open sides adjacent, means within the channel of the fixed manifold part and so related to the open side of the rotatable manifold part as to create within the manifold a suction force tending to induce exhaust, and means for supplying fuel to the crank case thru an opening formed in the crank shaft at one end.

In testimony whereof we hereunto affix our signatures.

ADOLPH BEHN.
JOHN G. SCHMITT.